United States Patent
Nishimoto et al.

(10) Patent No.: US 9,120,452 B2
(45) Date of Patent: Sep. 1, 2015

(54) VEHICLE OPERATION AUTHORIZATION SYSTEM

(71) Applicant: KABUSHIKI KAISHA TOKAI RIKA DENKI SEISAKUSHO, Aichi (JP)

(72) Inventors: Keigo Nishimoto, Aichi (JP); Masahiro Ikeyama, Aichi (JP)

(73) Assignee: KABUSHIKI KAISHA TOKAI RIKA SEISAKUSHO, Aichi (JP)

(*) Notice: Subject to any disclaimer, the term of this patent is extended or adjusted under 35 U.S.C. 154(b) by 130 days.

(21) Appl. No.: 13/732,608

(22) Filed: Jan. 2, 2013

(65) Prior Publication Data

US 2013/0179005 A1 Jul. 11, 2013

(30) Foreign Application Priority Data

Jan. 11, 2012 (JP) ................................. 2012-003339

(51) Int. Cl.
*B60R 25/10* (2013.01)
*B60R 25/24* (2013.01)

(52) U.S. Cl.
CPC ............. *B60R 25/1001* (2013.01); *B60R 25/24* (2013.01); *B60R 2325/205* (2013.01)

(58) Field of Classification Search
CPC ................... B60R 2325/202; B60R 2325/205; B60R 25/209; B60R 25/1001; G07C 9/00309; G07C 9/00571; G07C 9/00658; H04W 12/04–12/08
USPC ............................................................ 701/2
See application file for complete search history.

(56) References Cited

U.S. PATENT DOCUMENTS

| | | | |
|---|---|---|---|
| 2008/0138169 | A1 | 6/2008 | Jackson et al. |
| 2009/0212928 | A1 | 8/2009 | Aijaz |
| 2011/0215901 | A1 | 9/2011 | Van Wiemeersch et al. |
| 2012/0157079 | A1 | 6/2012 | Metivier |

FOREIGN PATENT DOCUMENTS

| | | |
|---|---|---|
| CN | 101199183 | 6/2008 |
| DE | 102005038471 | 2/2007 |
| JP | 07-310632 | 11/1995 |
| JP | 2004-088339 | 3/2004 |

(Continued)

OTHER PUBLICATIONS

Nomura, JP2004-190233, Jul. 8, 2004 (Machine Translation).*

(Continued)

*Primary Examiner* — Calvin Cheung
*Assistant Examiner* — Courtney Heinle
(74) *Attorney, Agent, or Firm* — Greenblum & Bernstein, P.L.C.

(57) ABSTRACT

A vehicle operation authorization system includes a server that receives identification information, which identifies a first portable electronic device that is used as an electronic key for a vehicle, from the first portable electronic device, verifies the identification information, and transmits an operation permission signal to the vehicle to permit a vehicle operation in accordance with a request from the first portable electronic device. A key registration unit registers an encryption key, which is provided from the server, to the first portable electronic device. An access authorization unit uses the encryption key, which is registered in the first portable electronic device, to grant access authorization for accessing the server to a second portable electronic device so that the second portable electronic device functions as the electronic key authorized to operate the vehicle.

9 Claims, 8 Drawing Sheets

(56) References Cited

FOREIGN PATENT DOCUMENTS

| | | |
|---|---|---|
| JP | 2005-282067 | 10/2005 |
| JP | 2006-177144 | 7/2006 |
| JP | 2007-315149 | 12/2007 |
| JP | 2010-126949 | 6/2010 |
| JP | 2010-244298 | 10/2010 |
| WO | 2008/070700 | 6/2008 |

OTHER PUBLICATIONS

Kumaki, JP2007-324926, Dec. 13, 2007 (Machine Translation).*
Frank, GB2402840, Dec. 15, 2004 (Machine Translation).*
Atanasov, "A short primer on cryptography," Columbia Science Review, 5(1):10-13, 2008.*
Japan Office Action in Japan Patent Application No. 2012-3339, mail date is May 26, 2015.

\* cited by examiner

```
                                    17
┌─────────────────────────────────────┐
│         Initial Registration Page   │
│                                     │
│     User Name    [            ]     │
│       Vehicle                       │
│   Identification No. [        ]     │
│      User ID     [            ]     │
│   User Password  [            ]     │
└─────────────────────────────────────┘
```

Fig.4A

| Registration No. | User Name | Vehicle Identification No. (Communication Unit No.) | User ID | User Password | Unique Terminal Information of Smartphone | Master Key | Valid |
|---|---|---|---|---|---|---|---|
| No.1 | A | ○○○○○ | ***** | ***** | 16427568 | ✓ | ✓ |
| No.2 | B | ××××× | ***** | ***** | 42162879 | ✓ | ✓ |
| No.3 | C | △△△△△ | ***** | ***** | 83253756 | ✓ | ✓ |
| | | | | | | | |

Fig.4B

| Registration No. | User Name | Vehicle Identification No. (Communication Unit No.) | User ID | User Password | Unique Terminal Information of Smartphone | Master Key | Valid |
|---|---|---|---|---|---|---|---|
| No.1 | A | ○○○○○ | ***** | ***** | 16427568 | ✓ | |
| | | | | | 32538868 | | ✓ |
| No.2 | B | ××××× | ***** | ***** | 42162879 | ✓ | ✓ |
| No.3 | C | △△△△△ | ***** | ***** | 83253756 | ✓ | ✓ |
| | | | | | | | |

VEHICLE OPERATION AUTHORIZATION SYSTEM

CROSS-REFERENCE TO RELATED APPLICATIONS

This application is based upon and claims the benefit of priority from prior Japanese Patent Application No. 2012-003339, filed on Jan. 11, 2012, the entire contents of which are incorporated herein by reference.

FIELD

The present invention relates to a vehicle operation authorization system that grants a portable electronic device authorization to operate a vehicle so that the portable electronic device can be used as an electronic key.

BACKGROUND

Japanese Laid-Open Patent Publication No. 7-310632 describes a remote engine starter system. When a vehicle is parked in a state in which its doors are locked and the engine is stopped, the engine can be started from a remote location with the remote engine starter system by operating an electronic key. The system includes a remote receiver, which is arranged in the vehicle to receive radio waves on the UHF band. When the electronic key is operated, the electronic key transmits an engine start request signal on UHF radio waves. The remote receiver receives the engine start request signal and authenticates the signal to verify the electronic key. When the electronic key is verified, the system starts the engine.

SUMMARY

If an advanced phone, such as a smartphone, can be used in lieu of a vehicle key, this would improve convenience since a smartphone is always carried by a user. In this case, it can be expected that the user would download a program (application) from a server to the smartphone so that the smartphone can implement the functions of an electronic key.

A smartphone is a terminal carried by a user. Thus, in a sense, the smartphone is customized for its user, or owner. When the electronic key functions are registered to just one smartphone belonging to one member of a family, the other members of the family would have to use the smartphone implementing with the electronic key functions. This would be inconvenient. Accordingly, it is desirable that other smartphones be allowed to perform a vehicle operation. However, in such a case, the security should be increased.

One aspect of the present invention is a vehicle operation authorization system including a server that receives identification information, which identifies a first portable electronic device that is used as an electronic key for a vehicle, from the first portable electronic device, verifies the identification information, and transmits an operation permission signal to the vehicle to permit a vehicle operation in accordance with a request from the first portable electronic device. A key registration unit registers an encryption key, which is provided from the server, to the first portable electronic device. An access authorization unit uses the encryption key, which is registered in the first portable electronic device, to grant access authorization for accessing the server to a second portable electronic device so that the second portable electronic device functions as the electronic key authorized to operate the vehicle.

A further aspect of the present invention is a vehicle operation authorization controlling method for controlling communication between a first portable electronic device and a vehicle through a server so that the first portable electronic device functions as an electronic key of the vehicle. The method includes acquiring a first encryption key from the server; using the first encryption key to provide a second portable electronic device, which differs from the first portable electronic device, with access authorization information used by the second portable electronic device to access the server; using a second encryption key, which corresponds to the first encryption key, to verify the second portable electronic device accessing the server based on the access authorization information; and transmitting an operation permission signal, which permits a vehicle operation requested by the second portable electronic device, from the server to the vehicle when the second portable electronic device is verified.

Another aspect of the present invention is a vehicle operation authorization controlling method for controlling communication between a first portable electronic device and a vehicle through a server so that the first portable electronic device functions as an electronic key of the vehicle. The method includes acquiring an encryption key from the server; using the encryption key so that encrypted verification is performed between the first portable electronic device and a second portable electronic device, which differs from the first portable electronic device; providing the second portable electronic device with access authorization information, which is used by the second portable electronic device, from the first portable electronic device to access the server when the encrypted verification is accomplished; receiving an operation request signal from the second portable electronic device accessing the server based on the access authorization information; and transmitting an operation permission signal, which permits a vehicle operation corresponding to the operation request signal, to the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 4A and 4B are tables showing registration contents of a database;

DESCRIPTION OF THE EMBODIMENTS

A first embodiment of a vehicle operation authorization system will now be described with reference to FIGS. 1 to 9.

System Configuration

Figure 1:
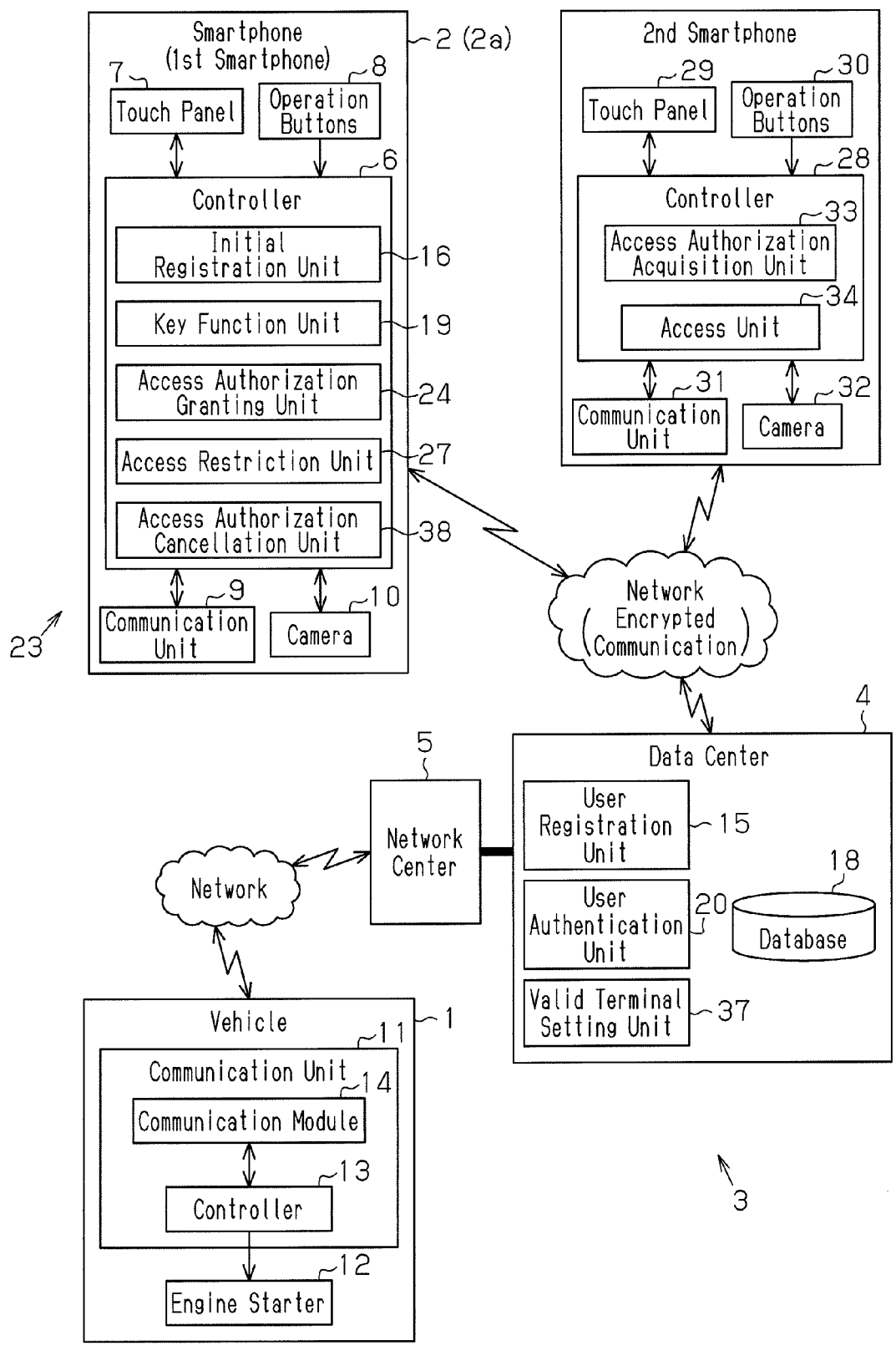
FIG. 1 is a schematic block diagram showing a first embodiment of a vehicle operation authorization system.

FIG. 1 shows a vehicle 1 that includes a vehicle remote operation system 3 that allows a user to use a smartphone 2 (advanced phone), which is carried by the user, in lieu of an electronic key to operate the vehicle 1 from a remote location. The vehicle remote operation system 3 includes a data center 4 and a network center 5. The data center 4 manages various types of information related to the user who has been registered with the vehicle remote operation system 3. The network center 5 can communicate with the vehicle 1 through, for example, wide area communication (network communication). The data center 4 is connected to the smartphone 2 through a wide area communication network (network communication) and connected to the network center 5 through a dedicated line. Examples of a wide area communication network include a cell phone packet network and the Internet. The smartphone 2 is one example of a portable electronic device. The data center 4 and network center 5 form a server.

The smartphone 2 includes a controller 6, which controls the operation of the smartphone 2, a touch panel 7, which shows various pages and which a user can touch and operate, operation buttons 8, a communication unit 9, which controls wide area communication, and a camera 10, which can capture images. The controller 6 controls a phone function and Internet communication function of the smartphone 2.

The vehicle 1 includes a communication unit 11, which allows for wide area communication with the network center 5, and an engine starter 12, which starts the engine. The communication unit 11 includes a controller 13, which controls the operation of the communication unit 11, and a communication module 14, which includes an antenna and a communication circuit. The communication unit 11 is powered by a vehicle battery and periodically monitors the reception of radio waves. The communication unit 11 may be installed when the vehicle 1 is manufactured or installed after the vehicle 1 is manufactured.

User Registration

The data center 4 includes a user registration unit 15 that registers the smartphone 2 that is used as an electronic key. The controller 6 includes an initial registration unit 16, which registers the user of the smartphone 2. The initial registration unit 16 is activated when the user performs a user registration operation by inputting a login URL of the vehicle remote operation system 3 to the smartphone 2. The initial registration unit 16 is one example of a key acquisition unit. Further, the user registration unit 15 and the initial registration unit 16 form a key registration unit.

Figures 2, 3:
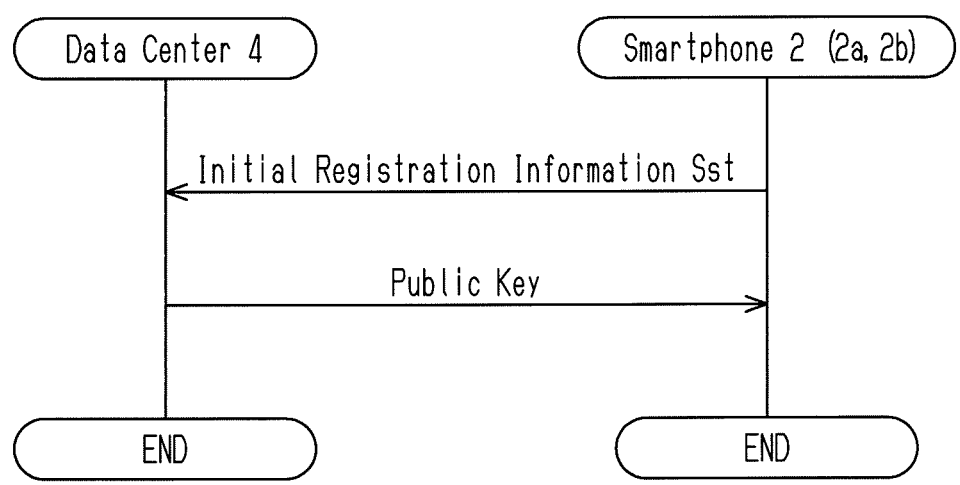
FIG. 2 is a schematic diagram of an initial registration page shown on a smartphone.
FIG. 3 is a schematic chart of a communication sequence executed during user registration.

When activated, the initial registration unit 16 displays the initial registration page 17 shown in FIG. 2 on the touch panel 7 of the smartphone 2. The initial registration page 17 includes fields for inputting the user name, identification number (manufacturing serial number) of the vehicle 1, user ID, and password. When the user completes the inputting of the necessary items to the initial registration page 17, the initial registration unit 16 transmits initial registration information Sst to the data center 4. In this state, the initial registration unit 16 adds unique terminal information (manufacturing serial number) to the initial registration information Sst.

Referring to FIG. 4A, the data center 4 includes a database 18 that stores information of the users registered to the vehicle remote operation system 3. The database 18 includes registration numbers, each including fields for setting a user name, vehicle identification number, user ID, and user password. For each registration number, the database 18 also includes fields for the unique terminal information of the smartphone 2, master key registration information, and valid registration information. The valid registration information can be registered for a plurality of smartphones 2. In other words, a plurality of smartphones 2 can be registered for a single vehicle 1. This allows for operation of the vehicle 1 with not only a certain smartphone 2 but also with another smartphone 2. The master key registration information indicates the smartphone 2 that is registered as a master key. The valid registration information also indicates the presently valid smartphone 2.

During user registration, the user registration unit 15 receives the initial registration information Sst from the smartphone 2 and writes the initial registration information Sst to the database 18. In this state, when the smartphone 2 indicated by the initial registration information Sst is designated as the master key that is to be registered, the user registration unit 15 marks the fields of master key registration information and valid registration information to set the smartphone 2 as the master key. This completes user registration.

As shown in FIG. 1, the data center 4 performs encrypted communication with the smartphone 2. The encrypted communication uses a private key encryption technique that uses two encryption keys, a private key and a public key. Thus, as shown in FIG. 3, when registering a user, the user registration unit 15 transmits to the smartphone 2 a public key that corresponds to a private key stored in the data center 4. The initial registration unit 16 registers the public key to the smartphone 2. Thus, when the smartphone 2 subsequently accesses the data center 4, encrypted communication is performed with the private key stored in the data center 4 and the public key acquired by the smartphone 2. In the private key encrypted communication, communication is established when the public key is correct and corresponds to the private key.

Normal Usage

As shown in FIG. 1, the smartphone 2 includes a key function unit 19, which allows the smartphone 2 to function as an electronic key. The key function unit 19 becomes valid when user registration is completed in the smartphone 2. The data center 4 includes a user verification unit 20 that verifies the user (smartphone 2) accessing the data center 4. The user verification unit 20 checks whether or not private key encrypted communication has been established and the authenticity of a verification code (user ID and user password) to verify the user accessing the data center 4.

Figure 5:
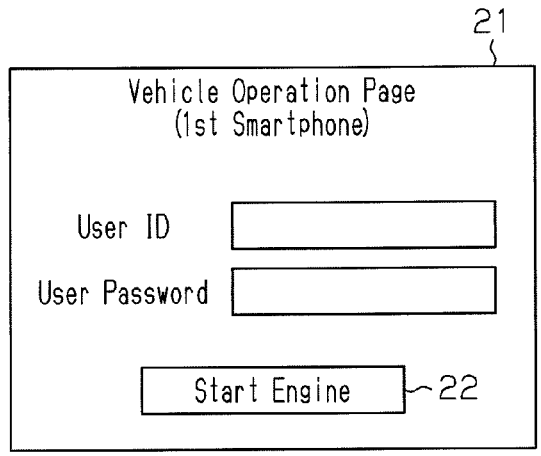
FIG. 5 is schematic diagram of a vehicle operation page shown on a first smartphone.
Figure 6:
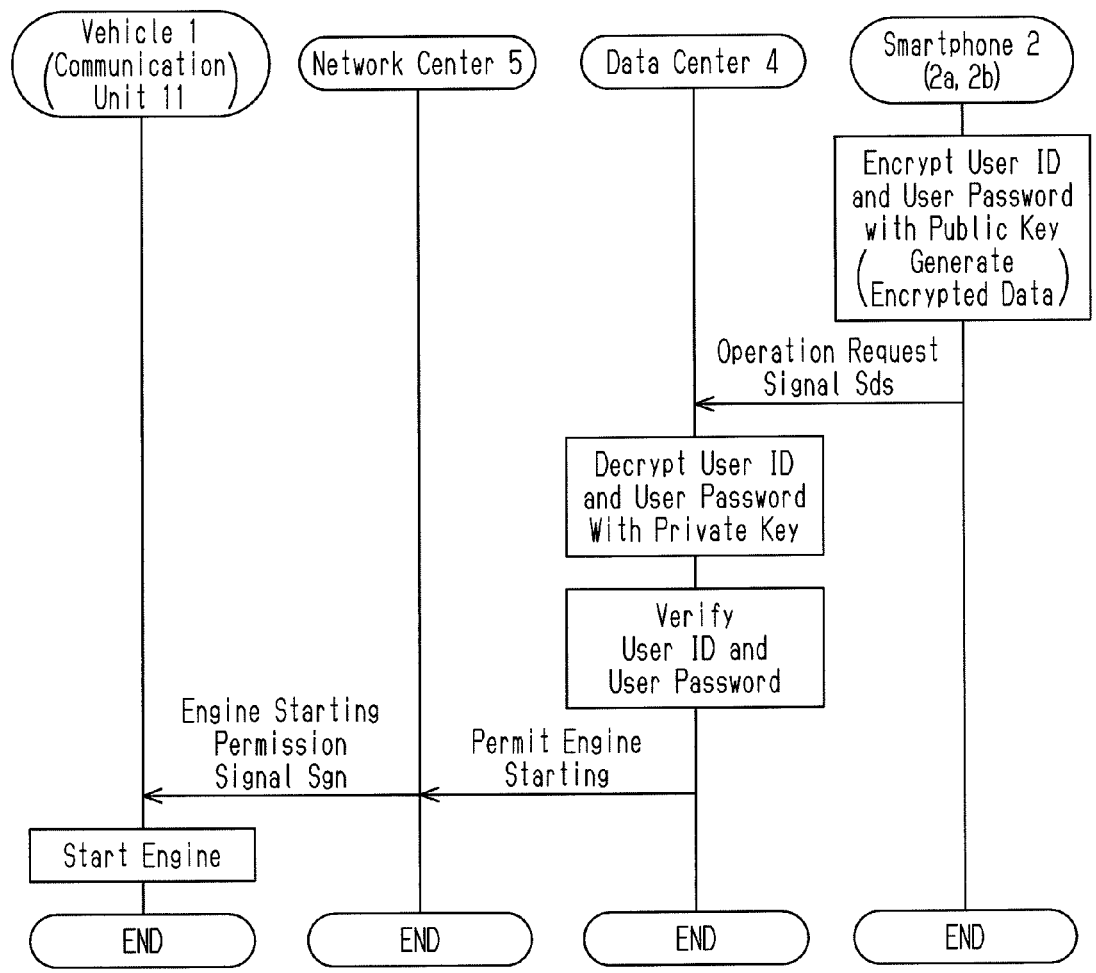
FIG. 6 is a schematic chart of a communication sequence executed when the first smartphone is used.

When the smartphone 2 undergoes an operation for activating the vehicle remote operation system 3, the key function unit 19 displays a vehicle operation page 21, which is shown in FIG. 5, on the touch panel 7. The vehicle operation page 21 is displayed using a browser and includes fields for inputting the user ID and password. After the necessary items are input to the vehicle operation page 21, when an engine start button 22 shown in the vehicle operation page 21 is operated, the key function unit 19 transmits an operation request signal Sds from the communication unit 9 as shown in FIG. 6. The operation request signal Sds includes encrypted data generated by encrypting a verification code (user ID and user password) input to the vehicle operation page 21 with the public key of the smartphone 2. The operation request signal Sds is one example of identification information.

When the user verification unit 20 of the data center 4 receives the operation request signal Sds, the user verification unit 20 decrypts the encrypted data of the operation request signal Sds with the private key stored in the data center 4. When the public key of the smartphone 2 is in correspondence with the private key of the data center 4, the encrypted data of the operation request signal Sds is decrypted in a normal manner.

The user verification unit 20 performs user verification by comparing the user ID and user password obtained by decrypting the operation request signal Sds (encrypted data) with the information in the database 18. When determining that the user ID and the user password conform to the information registered to the database 18, the user verification unit 20 determines that the true user is accessing the data center 4.

When determining that the true user is accessing the vehicle remote operation system 3, the user verification unit 20 of the data center 4 sends an engine start permission command to the network center 5. In response to the engine start permission command, the network center 5 transmits an engine start permission signal Sgn to the user's vehicle 1 as a request for starting the engine of the vehicle 1. The network center 5 transmits the engine start permission signal Sgn to the user's vehicle 1 through wide area communication. The engine start permission signal Sgn includes an ID code of the communication unit 11 and a function code that operates the engine starter 12 with the communication unit 11. The engine start permission signal Sgn is one example of an operation permission signal.

The communication unit 11 receives the engine start permission signal Sgn transmitted from the network center 5 with the communication module 14. Then, the controller 13 verifies the communication unit ID code in the engine start permission signal Sgn, which is received by the communication module 14, with an ID code stored in the controller 13. When the communication unit ID code is verified, the controller 13 sends an engine starting command, which is based on the function code in the engine start permission signal Sgn, to the engine starter 12.

Vehicle Operation Authorization

Referring to FIG. 1, the vehicle remote operation system 3 includes a vehicle operation authorization system 23 that can grant authorization to perform a vehicle operation, which is normally performed with a smartphone 2 (hereinafter, referred to as the first smartphone 2a), to another smartphone 2 (hereinafter, referred to as the second smartphone 2b). The vehicle operation authorization in the first embodiment is performed by encrypting the user ID and user password registered by the first smartphone 2a with a public key, acquiring the encrypted user ID and user password with the second smartphone 2b, and granting the second smartphone 2b the authorization to access the data center 4. Further, in the first embodiment, the vehicle operation authorization is performed by capturing an image to allow for the second smartphone 2b to directly acquire the encrypted user ID and user password. The first smartphone 2a is one example of a first portable electronic device, and the second smartphone 2b is one example of a second portable electronic device.

Figure 7:
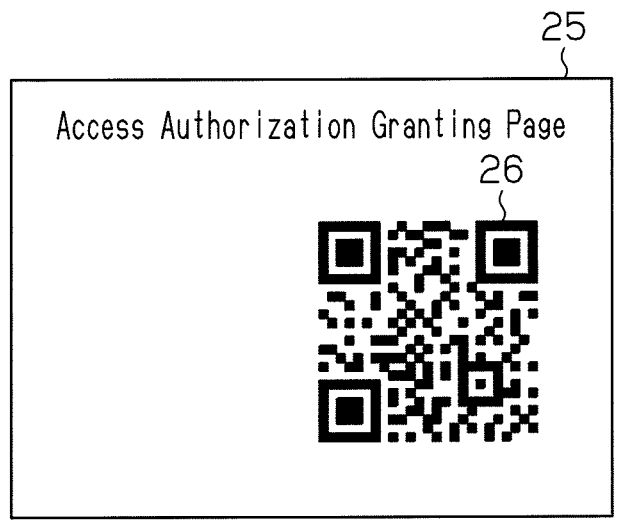
FIG. 7 is a schematic diagram showing an access authorization page.

The controller 6 of the first smartphone 2a includes an access authorization granting unit 24 that grants the second smartphone 2b authorization to access the data center 4. When the user performs an access authorization granting operation with the first smartphone 2a, the access authorization granting unit 24 displays an access authorization granting page 25, which is shown in FIG. 7, on the touch panel 7. The access authorization granting page 25 includes a two-dimensional barcode 26 such as a QR Code (registered trademark). The two-dimensional barcode 26 includes a login URL to the vehicle remote operation system 3 and encrypted data Dsim of the encrypted user ID and user password. The access authorization granting unit 24 generates the encrypted data Dsim by encrypting the user ID and user password with the public key transmitted from the data center to generate the two-dimensional barcode including the encrypted data Dsim. The two-dimensional barcode 26 is one example of encrypted information (access authorization information).

As shown in FIG. 1, the controller 6 includes an access restriction unit 27, which imposes restrictions on the access authorization granted to the second smartphone 2b. The access restriction unit 27 generates usage restriction information (additional information) notified to the second smartphone 2b, such as the access authorization period, the authorized number of accesses, and function restrictions. The access authorization restrictions are imposed on the second smartphone 2b by adding the usage restriction information to the two-dimensional barcode 26. The access restriction unit 27 is one example of an access authorization restriction unit.

In the same manner as the first smartphone 2a, the second smartphone 2b includes a controller 28, a touch panel 29, operation buttons 30, a communication unit 31, and a camera 32. The controller 28 includes an access authorization acquisition unit 33, which acquires authorization to access the data center 4 from the first smartphone 2a. In the first embodiment, the camera 32 captures an image of the two-dimensional barcode 26 displayed on the touch panel 7 of the first smartphone 2a, and the access authorization acquisition unit 33 acquires the login URL, the user ID, the user password, and the usage restriction information. The access authorization acquisition unit 33 temporarily stores the login URL, the user ID, the user password, and the usage restriction information acquired from the two-dimensional barcode 26 in a memory (not shown) of the controller 28. The camera 32 corresponds to an image capturing unit.

Figure 8:
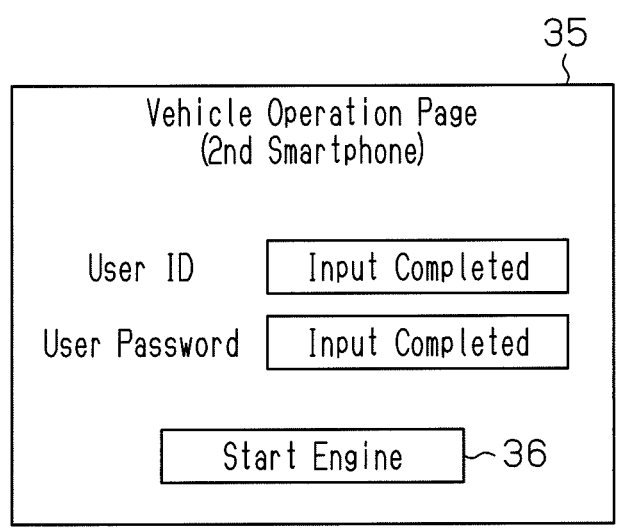
FIG. 8 is a schematic diagram of a vehicle operation page shown on a second smartphone.

The controller 28 also includes an access unit 34 that accesses the data center 4 using the login URL, user ID, and user password acquired from the first smartphone 2a. When the user performs a vehicle operation with the second smartphone 2b, the access unit 34 displays a vehicle operation page 35, which is shown in FIG. 8, on the touch panel 29. The vehicle operation page 35 is displayed using a browser and includes an engine start button 36. The vehicle operation page 35 also includes fields for inputting the user ID and password. However, the user ID and user password acquired from the two-dimensional barcode 26 are automatically written to these fields. In the first embodiment, the access authorization granting unit 24, the access authorization acquisition unit 33, and the access unit 34 form an access authorization unit.

When the engine start button 36 on the vehicle operation page 35 is operated, the access unit 34 transmits an operation request signal Sds as a vehicle operation request to the data center 4 based on a login URL. The operation request signal Sds includes unique terminal information of the second smartphone 2b, encrypted data Dsim, and a function code that requests for the engine to be started.

As shown in FIG. 1, the data center 4 includes a valid terminal setting unit 37, which sets one of the smartphones 2 as a valid terminal. When determining that the user ID and user password have been verified, the valid terminal setting unit 37 sets the smartphone 2 that has been verified as a valid terminal and marks the valid registration information field of the database 18. In other words, even when a smartphone 2 is currently set as an invalid terminal, when verification is accomplished, the verified smartphone 2 is set as a valid terminal. For example, as shown in FIG. 4B, in a state in which the first smartphone 2a (terminal information "16427568") is currently set as being valid, when the second smartphone 2b (terminal information "32538868") is verified, the valid terminal setting unit 37 validates the second smartphone 2b and invalidates the first smartphone 2a. This allows for a vehicle operation to be performed by only the second smartphone 2b. In this case, when the valid period (e.g., access authorization period set by usage restriction information) of the second smartphone 2b expires, the valid terminal setting unit 37 invalidates the second smartphone 2b and returns the first smartphone 2a to a valid state. The valid terminal setting unit 37 is one example of a usage restriction unit.

As shown in FIG. 1, the controller 6 of the first smartphone 2a includes an access authorization cancellation unit 38 so that the first smartphone 2a can forcibly cancel the access authorization granted to the second smartphone 2b. For example, when the user performs an access authorization cancellation operation with the first smartphone 2a, the access authorization cancellation unit 38 transmits an access authorization cancellation request signal Sat to the data center 4. When the valid terminal setting unit 37 receives the access authorization cancellation request signal Sat from the first smartphone 2a, which is the terminal registered as the master key, the valid terminal setting unit 37 sets the first smartphone 2a as the valid terminal again and cancels the access authorization of the second smartphone 2b. In other words, the valid terminal setting unit 37 invalidates all terminals other than the terminal registered as the master key when receiving the access authorization cancellation request signal Sat. The access authorization cancellation unit 38 is one example of an access authorization forcible cancellation unit.

Figure 9:
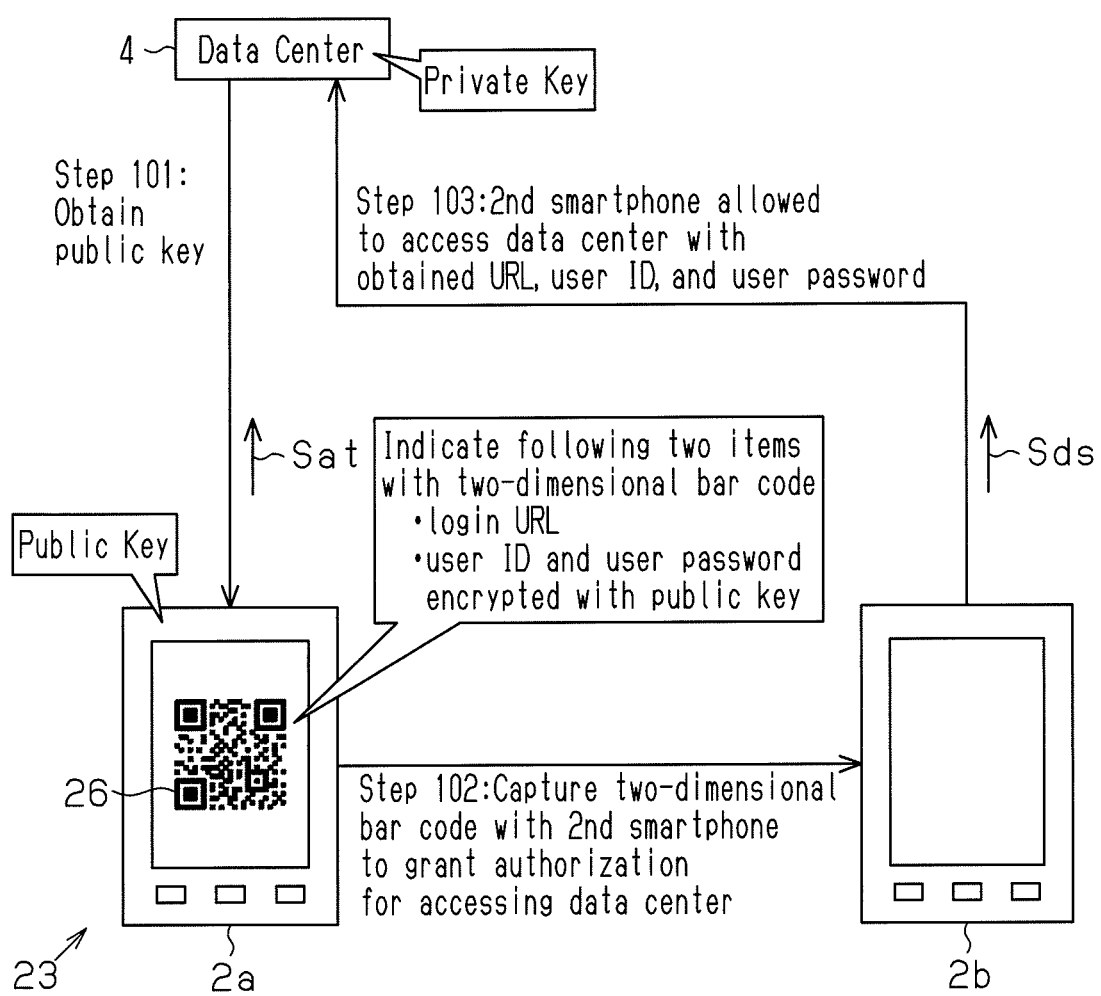
FIG. 9 is a schematic diagram of a communication sequence executed when vehicle operation authorization is executed.

The operation of the vehicle operation authorization system 23 of the present example will now be described with reference to FIG. 9.

First, in step 101, the first smartphone 2a obtains the public key from the data center 4. In this example, when the first smartphone 2a, which is normally used, is registered by a user registration operation, the public key is distributed from the data center 4 to the first smartphone 2a. The public key is registered to the first smartphone 2a.

In step 102, when the user performs an access authorization granting operation with the first smartphone 2a, the access authorization granting unit 24 (first smartphone 2a) displays the access authorization granting page 25, or the two-dimensional barcode 26, on the touch panel 7. When the second smartphone 2b captures the image of the two-dimensional barcode 26 with the camera 32, the access authorization acquisition unit 33 (second smartphone 2b) acquires the login URL to the vehicle remote operation system 3 and the user ID and password ID, which are encrypted by the public key. In this manner, the access authorization acquisition unit 33 acquires authorization from the first smartphone 2a to access the data center 4. Thus, vehicle operation authorization is granted by the first smartphone 2a to the second smartphone 2b.

In step 103, when the user performs a vehicle operation with the second smartphone 2b, the access unit 34 (second smartphone 2b) displays the vehicle operation page 35 on the touch panel 29. Further, when the engine start button 36 in the vehicle operation page 35 is operated, the second smartphone 2b starts accessing the data center 4. In this state, the access unit 34 transmits an operation request signal Sds that requests the engine of the vehicle 1 to be started, that is, encrypted data Dsim, which includes the user ID and user password encrypted by the public key, to the data center 4 based on the login URL.

When the data center 4 receives the operation request signal Sds from the second smartphone 2b, the user verification unit 20 verifies the second smartphone 2b based on the various information in the operation request signal Sds. The user verification unit 20 decrypts the encrypted data Dsim in the operation request signal Sds with the private key and verifies the decrypted user ID and user password with the information in the database 18 to determine whether or not the true user is accessing the data center 4. When determining that the true user is accessing the data center 4, the user verification unit 20 transmits an engine state permission notification to the network center 5 to allow for the smartphone 2b to start the engine. In this case, the valid terminal setting unit 37 sets the second smartphone 2b as the valid terminal. In other words, the second smartphone 2b is validated in lieu of the first smartphone 2b.

The network center 5 transmits an engine start permission signal Sgn to the vehicle 1 based on the communication unit ID code registered in the database 18. When the communication unit 11 receives the engine start permission signal Sgn, the communication unit 11 performs verification based on the communication unit ID code in the engine start permission signal Sgn. When the communication unit 11 verifies the communication unit ID code, the communication unit 11 sends a start command to the engine starter 12 and starts the engine.

When an access authorization usage restriction is imposed, that is, when the two-dimensional barcode 26 includes usage restriction information, the access unit 34 adds usage restriction information to the operation request signal Sds. The usage restriction information includes the access authorization period, the authorized number of accesses, and function restrictions of vehicle operations. The valid terminal setting unit 37 acquires the usage restriction information from the operation request signal Sds and acknowledges the usage restriction of the access authorization granted to the second smartphone 2b. The valid terminal setting unit 37 determines whether or not the valid period of the second smartphone 2b has expired based on the usage restriction of the access authorization. For example, when the number of times the second smartphone 2b accesses the vehicle (i.e., data center 4) exceeds the authorized number of accesses, the valid terminal setting unit 37 determines that the valid period of the second smartphone 2b has expired. In this case, the valid terminal setting unit 37 forcibly invalidates the second smartphone 2b and sets the first smartphone 2a, which is registered as the master key, as the valid terminal again. In the same manner, when the access authorization period for the second smartphone 2b is expired, the valid terminal setting unit 37 forcibly invalidates the second smartphone 2b and validates the first smartphone 2a again. When the valid period of the second smartphone 2b is expired, an access authorization granting operation is required to be performed again with the first and second smartphones 2a and 2b.

If the user performs an access authorization cancellation operation with the first smartphone 2a when the second smartphone 2b is granted access authorization, the access authorization cancellation unit 38 transmits an access authorization cancellation signal Sat to the data center 4. When the valid terminal setting unit 37 receives the access authorization cancellation request signal Sat, the valid terminal setting unit 37 invalidates the second smartphone 2b and sets the first smartphone 2a, which is registered as the master key, as the valid terminal again.

As described above, in the first embodiment, the first smartphone 2a encrypts the user ID and user password with the public key sent from the data center 4 and displays the two-dimensional barcode 26 on the touch panel 7 of the first smartphone 2a. The second smartphone 2b captures the image of the two-dimensional barcode 26 to acquire the user ID and user password from the first smartphone 2a. This grants the second smartphone 2b with authorization to access the data center 4, that is, authorization to operate the vehicle.

Accordingly, when the first smartphone 2a grants vehicle operation authorization to the second smartphone 2b, the user ID and user password are encrypted by the public key. Thus, the user ID and user password of the first smartphone 2a can be distributed to the second smartphone with a high security level. This prevents illicit acquisition of the user ID and user password and effectively prevents automobile theft. Further, the user ID and user password can be acquired just by capturing an image of the two-dimensional barcode 26 with the camera 32. This allows for the access authorization to be easily granted to the second smartphone 2b.

The first embodiment has the advantages described below.

(1) The first smartphone 2a acquires the public key from the data center 4, generates the two-dimensional barcode 26 including the login URL of the vehicle remote operation system 3 and the user ID and user password encrypted with the public key, and displays the two-dimensional barcode 26 on the touch panel 7 of the first smartphone 2a. The second smartphone 2b captures an image of the two-dimensional barcode 26 with the camera 32 to acquire the vehicle operation authorization. In this manner, an encryption key is used when the first smartphone 2a grants vehicle operation authorization to the second smartphone 2b. Thus, the vehicle operation authorization is securely granted from the first smartphone 2a to the second smartphone 2b.

(2) When the first smartphone 2a grants the second smartphone 2b authorization to access the vehicle 1 (data center 4), usage restrictions, such as the access authorization period, the authorized number of accesses, and function restrictions, can be set. Thus, when lending the vehicle 1 to another person, undesirable use of the vehicle can be prevented.

(3) When the first smartphone 2a grants the second smartphone 2b vehicle operation authorization, the use of the first smartphone 2a (vehicle operation authorization) is restricted. In this case, the terminal that can operate the vehicle 1 is only the second smartphone 2b. This satisfies a relationship of one vehicle key for one vehicle 1 and complies with Japanese regulations requiring for the combination of a transmitter and a receiver for a remote engine starter satisfy a one to one relationship.

(4) The vehicle operation authorization granted from the first smartphone 2a to the second smartphone 2b can be forcibly cancelled by the first smartphone 2a. Thus, the first smartphone 2a can be used to validate and invalidate the second smartphone 2b. This further increases the effect for preventing undesirable use of the vehicle 1.

(5) The user registration unit 15 provides the first smartphone 2a with a public key (encryption key) when the user is registered to the data center 4. Here, the initial registration unit 16 registers the public key to the first smartphone 2a when user registration is performed. This eliminates the need to acquire the public key from the data center each time the first smartphone 2a grants access authorization to the second smartphone 2b. Thus, processing is readily performed.

(6) The vehicle operation authorization of the first embodiment is performed by capturing an image of the two-dimensional barcode 26 with the camera. Thus, the vehicle operation authorization can be granted from the first smartphone 2a to the second smartphone 2b just by capturing an image, which is a simple operation.

A second embodiment will now be described with reference to FIGS. 10 to 12. The second embodiment differs from the first embodiment in how vehicle operation authorization is granted but basically has the same configuration as the first embodiment. To avoid redundancy, like or same reference numerals are given to those components that are the same as the corresponding components of the first embodiment. The description hereafter will focus on the differences from the first embodiment.

Figure 10:
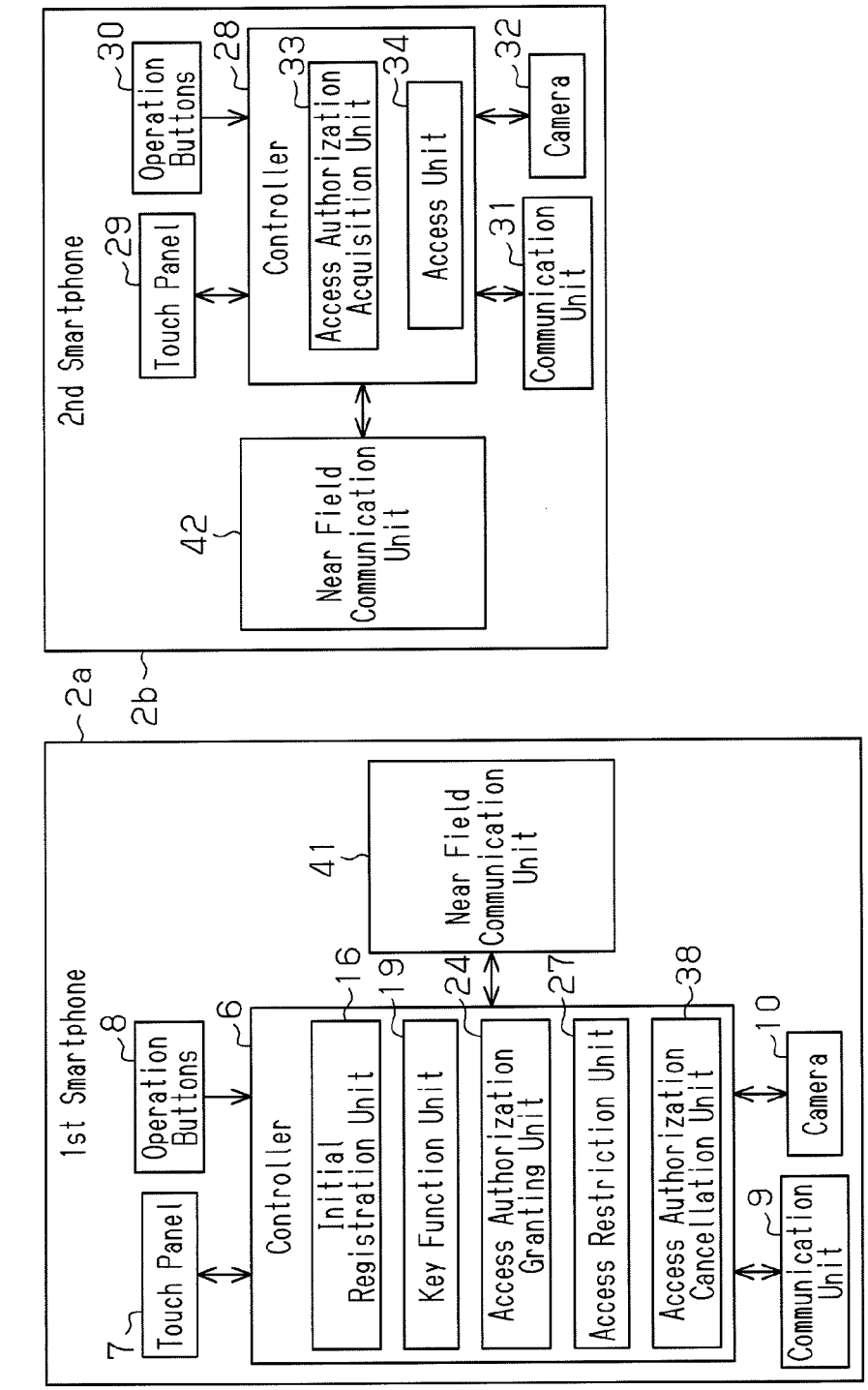
FIG. 10 is a schematic block diagram showing a second embodiment of a vehicle operation authorization system.

As shown in FIG. 10, the first smartphone 2a includes a near field communication unit 41. The second smartphone 2b also includes a near field communication unit 41. Near field communication (NFC) is one type of bidirectional communication performed over an extremely short distance of ten to twenty centimeters. There is a communication protocol used for near field communication. Further, encrypted communication is used for near field communication. In the vehicle operation authorization of the second embodiment, vehicle operation authorization is granted to the second smartphone 2b through encrypted communication performed between the first smartphone 2a and the second smartphone 2b.

Figure 11:
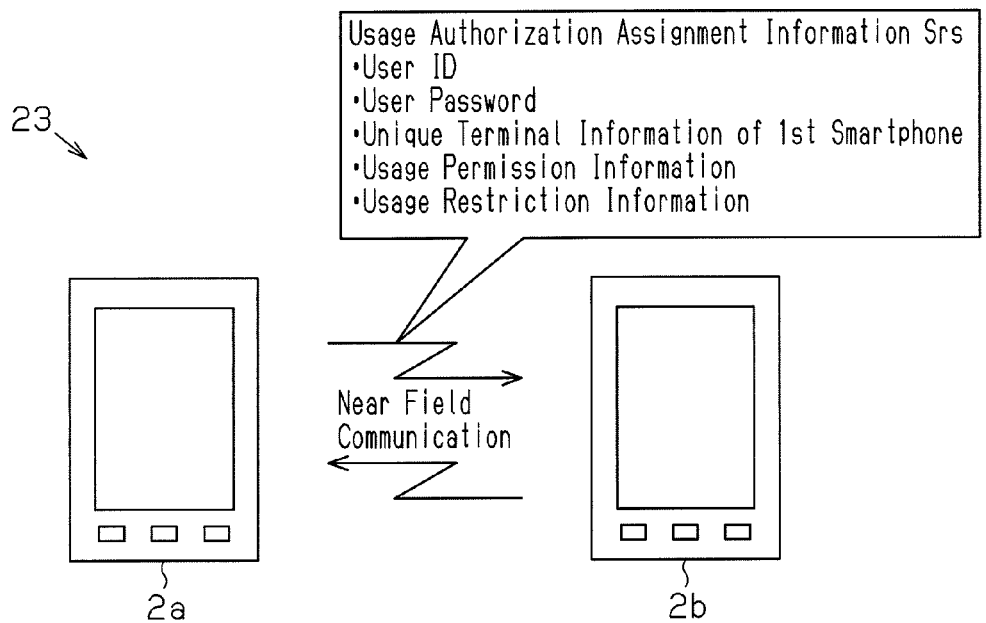
FIG. 11 is a diagram showing communication information that is used during vehicle operation authorization.

As shown in FIG. 11, the first smartphone 2a (access authorization granting unit 24) transmits usage authorization assignment information Srs from the near field communication unit 41 to the second smartphone 2b through near field communication. The communication of the usage authorization assignment information Srs uses, for example, challenge-response authentication. In the challenge-response authentication, a master device (in this case, the smartphone 2a) transmits a challenge code to a communication peer device (in this case, the smartphone 2b), receives a response code corresponding to the challenge code from the communication peer device, and determines whether or not the response code is correct. In the second embodiment, the public key (encryption key) is registered to both of the first and second smartphones 2a and 2b, and the public key is used to generate the challenge code and the response code.

The usage authorization assignment information Srs includes the user ID, user password, unique terminal information of the first smartphone 2a, usage authorization information, and usage authorization restriction information. The usage authorization information is a command that grants access authorization to the second smartphone 2b. The unique terminal information of the first smartphone 2a sent to the second smartphone 2b is used by the second smartphone 2b when initially logging in to the data center 4. The usage authorization assignment information Srs is one example of access authorization information.

The second smartphone 2b receives the usage authorization assignment information Srs, which is transmitted from the first smartphone 2a, with the near field communication unit 42. Here, when the challenge-response authentication is accomplished, the second smartphone 2b acquires the usage authentication assignment information Srs. Then, the second smartphone 2b (access authorization acquisition unit 33) temporarily stores the user ID, user password, unique terminal information of the first smartphone 2a, usage authorization information, usage authorization restriction information, and the like in a memory (not shown). The unique terminal information of the second smartphone 2b is also registered in advance in the memory.

Figure 12:
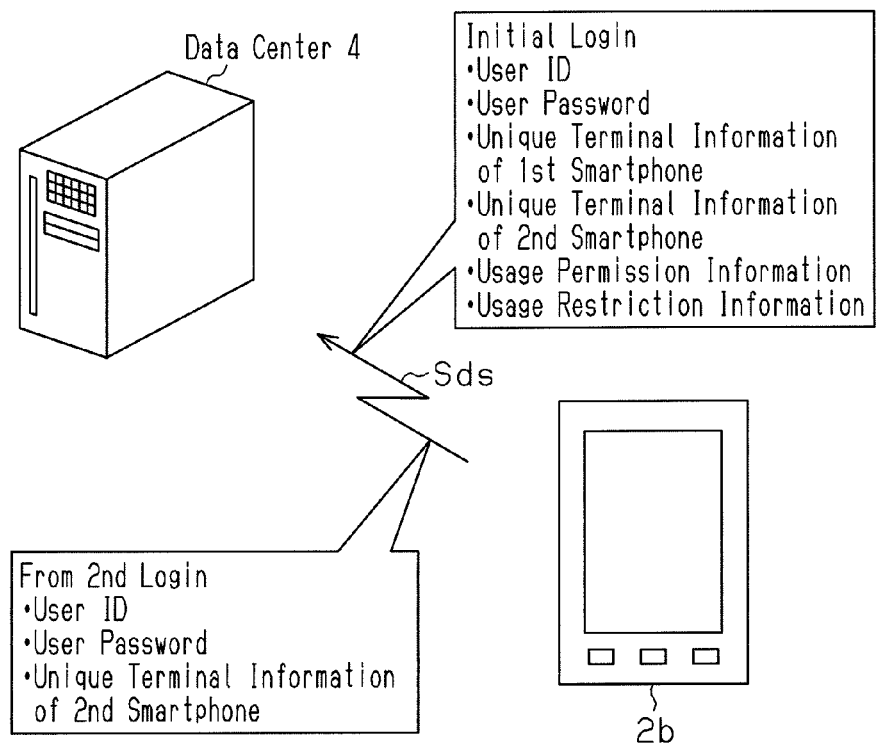
FIG. 12 is a diagram showing communication information that is used when performing a vehicle operation with the second smartphone.

As shown in FIG. 12, the second smartphone 2b (access unit 34), when initially logging in to the data center 4, transmits an operation request signal Sds, which is used for the initial login, to the data center 4. The initial login operation request signal Sds includes the user ID, user password, unique terminal information of the first and second smartphones 2a and 2b, usage authorization information, and usage authorization restriction information. When the data center 4 (user verification unit 20) verifies the user (second smartphone 2b) based on the information in the operation request signal Sds, the data center 4 transmits an engine start permission notification for the vehicle 1 to the network center 5. Then, the network center 5 transmits the engine start permission signal Sgn to the vehicle 1.

When the second smartphone 2b performs a second or subsequent login, the second smartphone 2b (access unit 34) transmits an operation request signal Sds for the second or subsequent login to the data center 4. To reduce the amount of transmission data, the second or subsequent login operation request signal Sds only includes the user ID, user password, and unique terminal information of the second smartphone 2b. When the data center 4 (user verification unit 20) verifies the user (second smartphone 2b) based on the information in the operation request signal Sds, the data center 4 transmits an engine start permission notification for the vehicle 1 to the network center 5. Then, the network center 5 transmits the engine start permission signal Sgn to the vehicle 1.

In addition to advantages (1) to (5) of the first embodiment, the second embodiment has the following advantage.

(7) The vehicle operation authorization of the second embodiment performs encrypted near field communication between the first smartphone 2a and the second smartphone 2b. Thus, the second smartphone 2b can be granted vehicle operation authorization with a high level of security.

It should be apparent to those skilled in the art that the present invention may be embodied in many other specific forms without departing from the spirit or scope of the invention. Particularly, it should be understood that the present invention may be embodied in the following forms.

In the above embodiments, the verification code used for vehicle operation authorization is not limited to the user ID and user password. For example, a communication unit code of the smartphone 2 registered as the master key may be used as the verification code.

In the above embodiments, the encrypted communication performed between the smartphone 2 and the data center 4 does not have to use encryption keys (private key and public key) and may be performed using other encryption schemes.

In the above embodiments, the distribution of the encryption key (public key) does not have to be performed during user registration and may be performed when, for example, granting vehicle operation authorization.

In the above embodiments, the vehicle operation authorization may be automatically cancelled when the usage period of the access authorization expires.

In the above embodiments, the data center 4 and the network center 5 may be combined into a single center.

In the above embodiments, the usage restrictions of the access authorization does not have to be imposed by the first smartphone 2a to the second smartphone 2b when the vehicle operation authorization is granted and may be, for example, imposed by the data center 4 to the second smartphone 2b.

In the above embodiments, when the vehicle operation authorization is granted to the second smartphone 2b, the data center 4 (valid terminal setting unit 37) sets the usage restriction to the first smartphone 2a. Instead, for example, when the vehicle operation authorization is granted to the second smartphone 2b, an authorization receipt completion signal may be transmitted from the second smartphone 2b to the first smartphone 2a so that the first smartphone 2a becomes unusable for a designated period.

In the above embodiments, the second smartphone 2b may return the vehicle operation authorization to the first smartphone through near field communication before the valid period (period during which the access authorization can be used) expires.

In the above embodiment, the forcible cancellation of the vehicle operation authorization granted to the second smartphone 2b can be performed by, for example, transmitting a forcible cancellation request signal from the first smartphone 2a to the second smartphone 2b.

In the first embodiment, instead of using the image capturing scheme when granting vehicle operation authorization, for example, encrypted ID information may be transmitted to the second smartphone 2b.

In the first embodiment, the encrypted information is not limited to the two-dimensional barcode 26 and may be other images or data.

In the second embodiment, the private key used for encrypted communication between the smartphone 2 and the data center 4 may differ from the encrypted key used for challenge-response authentication.

In the above embodiments, the vehicle remote operation system 3 may perform any one of single direction communication, which performs verification that is triggered when communication from an electronic key starts, or bidirectional communication, which performs verification that is triggered when communication from the vehicle 1 starts.

In the above embodiments, the application of the vehicle remote operation system 3 is not limited to a remote engine starter system and may be applied to any system that remotely operates an in-vehicle device.

In the above embodiments, various types of communication can be used for network communication by the vehicle remote operation system 3 and the vehicle operation authorization system 23.

In the above embodiments, the portable terminal is not limited to the smartphone 2 and may be a different terminal such as an IC card or tablet.

In the above embodiments, the identification information is not limited to the operation request signal Sds and may be any signal that performs ID verification. Further, the operation permission signal is not limited to the engine start permission signal Sgn and may be any signal that requests the vehicle 1 to perform an operation.

In the above embodiments, the vehicle operation authorization granting scheme does not have to read encrypted data (display data) or perform challenge-response authentication and may be performed through other encryption processes.

The first embodiment and the second embodiment may be combined.

The present examples and embodiments are to be considered as illustrative and not restrictive, and the invention is not to be limited to the details given herein, but may be modified within the scope and equivalence of the appended claims.

The invention claimed is:

1. A vehicle operation authorization system comprising:
   a first portable electronic device including a first controller and being usable as an electronic key for a vehicle;
   a second portable electronic device including a second controller and being usable as the electronic key for the vehicle;
   a server that receives identification information from the first portable electronic device, the identification information identifying the first portable electronic device, the server verifying the identification information, and transmitting an operation permission signal to the vehicle to permit a vehicle operation in accordance with a request from the first portable electronic device;

a key register that comprises the first controller and registers a first encryption key, which is provided from the server, to the first portable electronic device;

an access authorizer that comprises the first controller and the second controller, and that sends access authorization information from the first portable electronic device to the second portable electronic device without accessing the server by the second portable electronic device to grant access authorization for accessing the server to the second portable electronic device, so that the second portable electronic device functions as the electronic key authorized to operate the vehicle; and an accessor that comprises the second controller and accesses the server, based on the access authorization information, to transmit an operation request signal for requesting the vehicle operation to the server, wherein the operation request signal includes encrypted data generated by encrypting a user verification code for the vehicle with the first encryption key registered in the first portable electronic device; and the server decrypts the encrypted data with a second encryption key associated with the first encryption key to obtain the user verification code when the second portable electronic device accesses the server based on the access authorization information and transmits an operation permission signal to the vehicle to permit the vehicle operation in accordance with the operation request signal from the second portable electronic device when the user verification code is verified.

2. The vehicle operation authorization system according to claim 1, further comprising an access authorization restrictor that imposes a usage restriction to the access authorization granted to the second portable electronic device.

3. The vehicle operation authorization system according to claim 1, further comprising a usage restrictor that restricts the vehicle operation with the first portable electronic device when the access authorization is granted to the second portable electronic device.

4. The vehicle operation authorization system according to claim 1, further comprising an access authorization canceller that forcibly cancels the access authorization granted to the second portable electronic device.

5. The vehicle operation authorization system according to claim 1, wherein
the second portable electronic device includes an imaging device, and
the access authorizer generates encrypted information with the first encryption key, displays the encrypted information on the first portable electronic device, and grants the access authorization to the second portable electronic device based on the encrypted information captured by the imaging device of the second portable electronic device.

6. The vehicle operation authorization system according to claim 1, wherein the access authorizer grants the access authorization to the second portable electronic device through encrypted communication performed between the first portable electronic device and the second portable electronic device using the first encryption key.

7. The vehicle operation authorization system according to claim 1, wherein the key register registers the first encryption key to the first portable electronic device when a user performs user registration to the server.

8. A vehicle operation authorization controlling method for controlling a plurality of portable electronic devices including a first portable electronic device and a second portable electronic device, so that each of the first portable electronic device and the second portable electronic device functions as an electronic key of a vehicle, the method comprising:
acquiring a first encryption key from a server through communication between the first portable electronic device and the server;
registering the first encryption key in the first portable electronic device;
generating encrypted data by encrypting a user verification code for the vehicle with the first encryption key registered in the first portable electronic device;
transmitting access authorization information from the first portable electronic device to the second portable electronic device without accessing the server by the second portable electronic device, wherein the access authorization information is used when the second portable electronic device accesses the server;
accessing the server by the second portable electronic device, based on the access authorization information, to transmit an operation request signal for requesting a vehicle operation from the second portable electronic device to the server, wherein the operation request final includes the encrypted data;
decrypting the encrypted data by using a second encryption key, which is associated with the first encryption key, to obtain the user verification code when the second portable electronic device accesses the server based on the access authorization information;
confirming the user verification code to verify the second portable electronic device that accesses the server based on the access authorization information; and
transmitting an operation permission signal, which permits the vehicle operation in accordance with the operation request signal from the second portable electronic device, from the server to the vehicle when the second portable electronic device is verified.

9. A vehicle operation authorization controlling method for controlling a plurality of portable electronic devices including a first portable electronic device and a second portable electronic device so that each of the first portable electronic device and the second portable electronic device functions as an electronic key of a vehicle, the method comprising:
acquiring, by the first portable electronic device, an encryption key from a server through communication between the first portable electronic device and the server;
registering the encryption key in the first portable electronic device;
acquiring, by the second portable electronic device, the encryption key from the server through communication between the second portable electronic device and the server;
registering the encryption key in the second portable electronic device;
performing encrypted communication using the encryption key between the first portable electronic device and the second portable electronic device, to provide the second portable electronic device with access authorization information from the first portable electronic device without accessing the server by the second portable electronic device, wherein the access authorization information is used when the second portable electronic device accesses the server;

accessing the server by the second portable electronic device, based on the access authorization information, to transmit an operation request signal for requesting a vehicle operation from the second portable electronic device to the server, wherein the operation request final includes a user verification code;

confirming the user verification code to verify the second portable electronic device that accesses the server based on the access authorization information; and transmitting an operation permission signal, which permits the vehicle operation in accordance with the operation request signal from the second portable electronic device, from the server to the vehicle when the second portable electronic device is verified.

* * * * *

UNITED STATES PATENT AND TRADEMARK OFFICE
CERTIFICATE OF CORRECTION

| | | |
|---|---|---|
| PATENT NO. | : 9,120,452 B2 | Page 1 of 1 |
| APPLICATION NO. | : 13/732608 | |
| DATED | : September 1, 2015 | |
| INVENTOR(S) | : K. Nishimoto et al. | |

It is certified that error appears in the above-identified patent and that said Letters Patent is hereby corrected as shown below:

On the Title Page, (73) Assignee, please change "KABUSHIKI KAISHA TOKAI RIKA SEISAKUSHO" to -- KABUSHIKI KAISHA TOKAI RIKA DENKI SEISAKUSHO --.

IN THE CLAIMS

Column 14, line 28 (claim 8, line 25), please change "request final" to -- request signal --.

Column 15, line 8 (claim 9, line 32), please change "request final" to -- request signal --.

Signed and Sealed this
First Day of March, 2016

Michelle K. Lee
*Director of the United States Patent and Trademark Office*